ns in the die matrices, as is customary in machines of this kind.

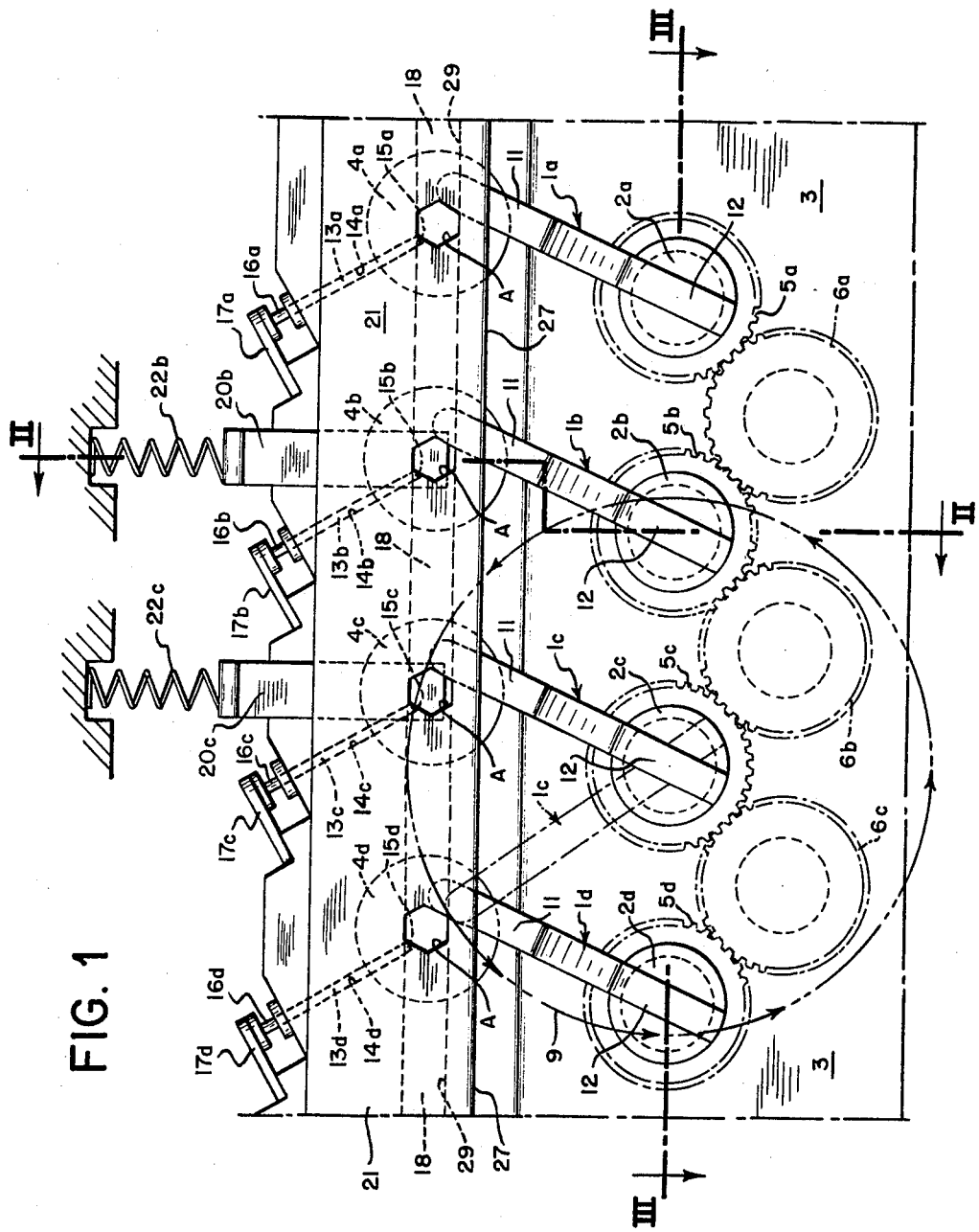

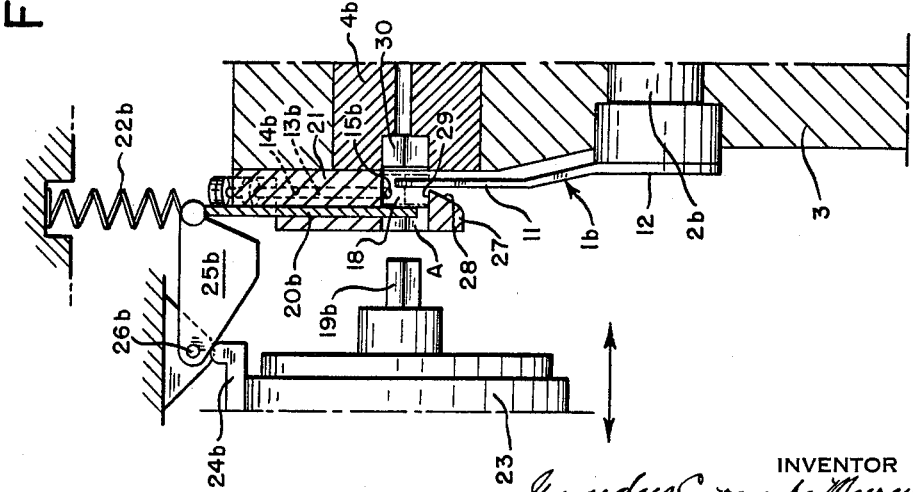

United States Patent Office 3,274,626
Patented Sept. 27, 1966

3,274,626
TRANSFER MEANS FOR MACHINE FOR MAKING BOLTS, NUTS AND THE LIKE
Gerardus C. van de Meerendonk, Helmond, Netherlands, assignor to Nedschroef Octrooi Maatschappij, N.V., Helmond, Netherlands, a limited-liability company of the Netherlands
Filed Dec. 10, 1963, Ser. No. 329,428
Claims priority, application Netherlands, Dec. 10, 1962, 286,483
15 Claims. (Cl. 10—12)

The present invention relates to improvements in machines for making bolts, nuts and similar articles, in which blanks or workpieces are successively subjected to a series of treatments in matrices or similar shaping members, and are provided with means for successively transferring the workpieces from one treating station to another.

In the known machines of the above-mentioned type, the transfer members consist of clamping fingers movable towards each other, which must perform a stroke going to and fro in order to effect the transfer of the workpieces from one station to another. Owing to the occurring mass forces involved in these reciprocating movements, this construction is bound to a rather limited speed.

The object of the present invention is to provide an article-forming machine in which the transfer mechanism is not limited in its speed of operation but is effectively operable at any speed at which the forming mechanism of the machine can operate.

In a machine according to the invention the transfer mechanism comprises single-armed levers, sweeps or arms which are rotatable about spaced parallel axes and cooperate with a guiding means extending along the treating stations of the machine, for the workpieces which are transferred from station to station by the rotating arms, each of which is adapted to move a workpiece from one station to the next during each revolution.

In an embodiment of the machine according to the invention, the circular arc described by the outer end of each of the transfer arms intersects the guiding means back of the workpiece at one station, just in front of the path of movement of the working tool thereof, and at the end of the advancing movement of the workpiece, in front of the next station and the path of movement of the next working tool, the transfer arms being rotated in a direction corresponding to the desired direction of movement of the workpieces along the guiding means.

Additionally, the machine according to the invention includes adjacent to each working station and in the path of the workpieces to be advanced, a member for locating and fixing the workpiece as it arrives at said station, said member being shiftably arranged under spring pressure in such a direction, that the associated rotating transfer arm member can push away said fixing member against the spring pressure via the workpiece present in the station in question when the arm moves the workpiece along the guiding means from that station to the next station or out of the machine.

The machine includes other features cooperating with the rotatable arms, guiding means and workpiece-locating means as described in the following detailed description made in connection with the accompanying drawings.

In the drawings an embodiment is illustrated, by way of example, of a machine according to the invention.

FIG. 1 is a diagrammatic elevational view of a part of the machine taken in front of the die block, in which bolts, nuts or similar articles are formed in matrices or dies from blanks or workpieces;

FIG. 2 is a cross-sectional view taken on the line II—II in FIG. 1;

FIG. 3 is a horizontal cross-sectional view of a part of the machine in FIG. 1 taken on the line III—III, in which the single-armed transfer levers or arms are shown in a position overlapping the next adjacent arm unit.

In the drawings the transfer arms or levers are indicated by $1a$, $1b$, $1c$, $1d$. They are fixed respectively to parallel shafts $2a$, $2b$, $2c$, $2d$, which are rotatably supported in a portion of the die block 3 of the machine, in which the die matrices $4a$, $4b$, $4c$, $4d$ are arranged. The shafts $2a$, $2b$, $2c$, and $2d$ respectively carry similar gears $5a$, $5b$, $5c$ and $5d$ and receive a continuous rotating movement by means of similar cooperating gears $6a$, $6b$, $6c$, which mesh with the gears on the shafts in the manner indicated in FIG. 1. The driving of the gears of the whole gear train is effected by means of a sprocket wheel 7, fixed to the shaft $2a$ to which the gear $5a$ is fixed, and a drive chain 8 operating on the sprocket wheel 7 and driven by the drive of the machine. The rotation of the transfer arms $1a$ to $1d$ is consequently synchronous and their rotation is synchronized with the movement of a tool slide or carrier 23 illustrated diagrammatically in FIG. 2. They are arranged mutually parallel and remain parallel. The projecting free ends of the arms or levers $1a$ to $1d$ each describe a circular path, illustrated in FIG. 1 for the lever $1c$ by a circle 9.

The shafts $2a$ to $2d$ have the same spacing as the dies $4a$ to $4d$ and since this spacing, as illustrated in FIG. 1 is less than the radial length of the transfer arms $1a$ to $1d$, they overlap during rotation in the manner shown in FIG. 3. Therefore, each arm comprises parallel portions 11 and 12, as shown in FIG. 2 connected by an intermediate portion extending outwardly from the portion 12 to the portion 11. The portion 11 of each arm, therefore, is capable of passing over the portions 12 during rotation, as shown in FIG. 3.

The arms $1a$ to $1c$ are adapted to move workpieces in succession along a guiding means 18 from one working station to the next (arm $1d$ moves a workpiece from the last station) and each station is provided with means for locating or fixing a workpiece arriving at a station directly in front of the die matrix. This means includes pins $13a$ to $13d$ located respectively at the series of die stations, as shown in FIGS. 1 and 2. These pins extend respectively through inclined bores $14a$ to $14d$ in a block 21 secured to the die block 3. The pins have respective lower ends $15a$ to $15d$, which cooperate with and locate the workpieces respectively in the guiding means 18 in front of the die matrices, and upper ends $16a$ to $16d$, attached to and subjected respectively to the force of leaf springs $17a$ to $17d$.

In the illustrated embodiment of the machine, the workpieces are moved from right to left and accordingly the transfer arms rotate counterclockwise. In this arrangement the projecting ends of the transfer arms $1a$ to $1c$ are adapted during counterclockwise rotation to exert such a pressure on the lower ends of the supporting pins by way of the intervening workpieces at the respective stations that the pins are pushed away in their respective bores, so that the workpieces can be transferred by the ends of the arms to the next working station. This transfer is effected through the guiding means 18 illustrated as a channel-shaped guideway provided in the lower portion of the block 21 and extending across the die block directly in front of the dies $4a$ to $4d$. The pins $13a$ to $13d$ are adapted to accurately stop and locate the workpieces directly in front of the respective die matrices during the operation of the machine.

The guideway 18 is provided with openings directly opposite the die matrices and illustrated in FIG. 1 by hexagonal openings A through which the punches or movable dies are adapted to pass for movement of the workpieces into the die matrices 4a to 4d. FIG. 2 illustrates diagrammatically a reciprocable slide or carriage 23 which is arranged in a known manner for movement toward and away from the die block. In this view, one of the punches, 19b, is illustrated in a retracted position opposite the die matrix 4b. The openings A in the block 21 may have other shapes than hexagonal, and the various punches or other tools 19a to 19d may have the shape desired for use in the making of a particular article.

The guideway 18 is provided with a slot therealong for the passage of the ends of the arms 1a to 1d. In the structure shown in FIG. 2, the lower end portion 27 of the block 21, forming the lower part of the guideway 18, is spaced from the die block 3 to provide a narrow slot or opening 28 along the guideway for the ends of the arms 1a to 1d. The bottom of the guideway 18 is defined by a shelf 29 extending the full length of the guideway and along which the workpieces are moved by the end portions of the arms 1a to 1d which move into, through and out of the slot 28 and the guideway 18 during their rotation. The bottom of the guideway may include portions on both sides of the slot 28.

After a punch stroke is effected on the workpieces in the die matrices, the workpieces are pushed out onto the bottom 29 of the guideway 18 by an ejecting pin of the usual type, not shown. Means is provided for retaining the workpieces in the guideway and preventing them from moving into the openings A, including guide members 20a to 20d for the respective die stations in the form of a flap or flat plate mounted in a vertically shiftable position in the block 21 as illustrated in detail in FIG. 2 with respect to the member 20b. When the punch slide is retracted, the members 20a to 20d move downwardly across the openings A, each being located with their inner surface in line with the side wall of the guideway 18 in the block 21. Members 20a to 20d are held in the down position, as illustrated in FIG. 2, respectively by means of compression springs 22a to 22d, two of which are shown in FIG. 1. When the punch slide or carriage 23 with its punches is moved toward the die head 3, pawls 24a to 24d, fixed to the carriage 23, respectively engage and act on cams 25a to 25d which are pivotally mounted respectively on shafts 26a to 26d (illustrated with respect to the b station in FIG. 2). As the tool slide or carriage 23 moves toward the die head, the cam 25b, pivotally attached to the top of the member 20b is pivoted upwardly against the action of compression spring 22b, to lift the member 20b so that the punch 19b can move through the opening A, press the workpiece into the die matrix 4b and subject it to a forming operation, as illustrated by the workpiece 30 in the die 4b. As the carriage 23 returns to the position shown in FIG. 2, the flap member 20b moves downwardly under the action of the spring 22b across the opening A so that the formed workpiece 30 when it is pushed out of the matrix will be retained in the guideway 18 where it is engaged and moved along by the end portion of the arm 1b. For convenience, the workpiece 30 is illustrated in FIG. 2, in the die 4b. As it is being pushed out of the die, and before emerging therefrom, the bottom of its forward portion moves onto the ledge or bottom 29 of the guideway 18, after which it is pushed against the member 20b, so that it rests on the bottom 29.

From the showing in FIG. 1, it will be noted that the shafts 2a to 2d are located in offset position to the left, i.e. in the direction of desired movement of the workpieces, with respect to the corresponding die matrices, in such a way that the arcs described by the ends of the transfer arms are such that the arms exert an upwardly directed pressure on the workpieces at the time they are first engaged and a somewhat downwardly directed pressure as the workpieces are moved to the next station. As a result, the upwardly directed pressure at the beginning is substantially in the direction of the inclined locating pins 13a to 13d and they are pushed upwardly to permit the workpieces to be moved along the guideway 18. At the end of the stroke the applied pressure is almost at right angles to the pins 13a to 13d as the workpieces are moved into engagement with the lower ends of the pins.

It will be understood that suitable blanks are cut from bar stock in the usual way to form the desired articles in the machine. Such blanks are introduced into the guideway 18 at the right and are moved successively in timed relation to the stroke of the slide into the first station 4a against the pin 13a by means not illustrated, which may be an additional transfer arm and associated mechanism similar to the arm 1a used for moving a workpiece from the first station to the next. Upon being positioned against pin 13a, the workpiece is pushed into the die matrix 4a by the die 19b moving horizontally through opening A. As above mentioned, the workpiece is removed from the die matrix 4a and repositioned within the guideway 18 by an ejection pin, not shown. The workpiece is now set to be moved to station 4b by the counterclockwise rotation of transfer arm 1a. It is evident upon viewing FIG. 1 that the transfer arm 1a, due to its length and rotation about the axis of shaft 2a, is only able to push the workpiece to a position just against pin 13b. When the workpiece is positioned just against pin 13b, the transfer arm 1a continues its rotation and slides downwardly from contact with the workpiece thus leaving the workpiece at station 4b. Accordingly, only after the transfer arm moves in a downward direction upon leaving contact with the workpiece is the stroke of the carriage 23 timed to push the workpiece into the die matrices 4a, 4b, 4c and 4d. Thus if the blanks are introduced successively into the channel 18 in the path of movement of a transfer arm, such blanks will be transferred successively to the station with which such arm is associated. The transfer arm 1d, of course, moves the finished workpiece out of the end of the guideway at the left.

The improved transfer mechanism of the present invention has a number of advantages stemming from the use therein of relatively simple transfer arms which include no complicated clamping or adjusting means and which, during the operation of the machine, are rotated continuously in one direction. The use of a simple transfer arm for each station rotating continuously does not involve any reciprocating motions or complicated reversing transfer slide mechanisms and uses relatively little power compared to such mechanisms.

The invention has been described in connection with a single embodiment of the machine, but it will be understood by those familiar with such machines and transfer mechanisms that the dies, guiding means and associated mechanisms may extend at an incline or vertically instead of horizontally as in the described embodiment, and that other modifications may be made in the structures of the specific means employed in the illustrated embodiment. Such modifications are contemplated as coming within the scope of the present invention as defined in the accompanying claims.

What is claimed is:

1. In a machine for forming articles of the type including a stationary die for receiving a workpiece, a reciprocable tool carrier movable toward and away from the die for pressing workpieces in the die, and a transfer mechanism for moving a workpiece into a position in front of the die, the improvement in which the transfer mechanism comprises a workpiece-guiding means located adjacent the die for guiding the workpiece along a path to a position in front of the die, and a continuously rotatable transfer arm mounted in a position with respect to the die such that its projecting end portion moves along the guiding means to engage a workpiece carried thereby and move the workpiece into a position in front of the die where the transfer arm leaves the workpiece in a position to be pushed into the die and continues in its rotation.

2. A machine as claimed in claim 1, including means located adjacent the die for stopping and locating the workpiece moved by the arm to said position directly in front of the die.

3. A machine as claimed in claim 2, including a second rotatable arm similar to said rotatable arm and mounted in spaced parallel relation therewith, means for continuously rotating said arms in synchronism in one direction, said second arm being mounted for rotation in a position relative to said die such that its projecting end portion moves along the guiding means to engage a workpiece in said position in front of the die and move it along the guiding means against the action of said stopping means and away from said die.

4. A machine as claimed in claim 3, including resilient biasing means for urging the workpiece-stopping means to its workpiece stopping position.

5. A machine as claimed in claim 3, in which the guiding means is provided with a longitudinal slot for the passage of the projecting end portions of the rotatable arms.

6. A machine as claimed in claim 1, including a second rotatable arm similar to said rotatable arm and mounted in spaced parallel relation thereto, a rotatable shaft for each arm mounted in spaced relation to the die and to which the arm therefor is attached, and means for continuously rotating said arms in synchronism in the same direction, said second arm being mounted for rotation in a position relative to said die such that its projecting free end portion moves along the guiding means to engage a workpiece in said position in front of the die and move it along the guiding means and away from said die, said guiding means comprising a channel-shaped guideway located in front of the die, the guideway being provided with a longitudinal slot for the passage of the projecting end portions of the rotatable arms.

7. A machine as claimed in claim 6, in which the die opens into the guideway and the wall of the guideway opposite the die is provided with an opening for the passage of a tool carried by the tool carrier.

8. A machine as claimed in claim 7, including means operable in synchronism with the movement of the tool carrier for covering said opening in said wall of the guideway as the tool carrier withdraws the tool therefrom and for uncovering said opening as the tool carrier moves the tool toward said opening.

9. In a machine for forming metal articles, a frame, a die block mounted in the frame having a vertically disposed die breast, a plurality of spaced die stations each including a die opening for receiving a workpiece arranged in said die breast with the axes of said dies located in the same plane, a reciprocable tool carrier movable toward and away from the die breast for pressing workpieces in the die openings, and transfer mechanism for transferring workpieces from one die station to the next, the improvement in which the transfer mechanism comprises a guideway extending in front of the die openings and a plurality of spaced rotatable arms respectively mounted on shafts located in spaced relation to the guideway and having axes parallel to the die axes, said arms being mounted in spaced parallel relation, and means for continuously rotating said arms in synchronism such that their free outer end portions move along the guideway in the direction of desired movement of the workpieces along the guideway, said rotatable arms being respectively mounted in a position with respect to the respective die openings such that the projecting free end portion of each arm moves along the guideway to engage a workpiece carried in the guideway and move the workpiece in said direction from a position in front of one die opening to a position directly in front of the next die opening.

10. A machine as claimed in claim 9, in which the free end portion of each transfer arm during its rotation intersects the guideway in front of the path of movement of the working tool for one die and in front of the path of movement of the working tool for the next die.

11. A machine as claimed in claim 10, in which each die station includes a spring biased means for locating a workpiece transferred to said station by a rotatable arm directly in front of the die opening thereat.

12. A machine as claimed in claim 9, in which the guideway is a channel-shaped guideway provided with a longitudinal slot for passing the free end portions of the rotatable transfer arms.

13. A machine as claimed in claim 9, in which the radial length of each rotatable arm is greater than the distance between the axes of adjacent shafts on which the arms are mounted, each rotatable arm including inner and outer parallel sections connected by an intermediate section, and in which the outer section is offset outwardly with respect to the inner section, whereby the outer section of each rotatable transfer arm may pass over the inner section of an adjacent arm during its rotation.

14. A machine as claimed in claim 12, in which the channel-shaped guideway includes a wall spaced in front of the die breast, and in which the die breast serves as the opposite wall of the channel-shaped guideway.

15. A machine as claimed in claim 14, in which said wall of the channel-shaped guideway is provided with openings respectively opposite the die openings of the die stations through which the tools carried by the carrier are adapted to move, and means for closing the openings in said wall of the guideway when the tools are retracted therefrom.

References Cited by the Examiner
UNITED STATES PATENTS
2,657,403   11/1953   Eade et al. _____ 10—77

ANDREW R. JUHASZ, *Primary Examiner.*